(12) United States Patent
Hasegawa (10) Patent No.: US 6,185,188 B1
(45) Date of Patent: Feb. 6, 2001

(54) METHOD AND APPARATUS FOR CONTROLLING PHYSICAL PORT FLOW RATE IN PACKET COMMUNICATIONS

(75) Inventor: Jun Hasegawa, Yokohama (JP)

(73) Assignee: Kabushiki Kaisha Toshiba, Kanagawa-Ken (JP)

(*) Notice: Under 35 U.S.C. 154(b), the term of this patent shall be extended for 0 days.

(21) Appl. No.: 08/990,290

(22) Filed: Dec. 15, 1997

(30) Foreign Application Priority Data

Dec. 16, 1996 (JP) .................................................. 8-335826

(51) Int. Cl.[7] .................................................. H04J 3/14
(52) U.S. Cl. ........................................ 370/235; 370/462
(58) Field of Search ................................... 370/230, 232, 370/235, 236, 395, 396, 398, 411, 415, 416, 420, 462

(56) References Cited

U.S. PATENT DOCUMENTS

| 5,434,850 | * | 7/1995 | Fielding et al. | 370/321 |
| 5,487,155 | * | 1/1996 | Drewry et al. | 710/131 |
| 5,628,030 | * | 5/1997 | Tuckner | 710/64 |

FOREIGN PATENT DOCUMENTS 7015441   1/1995   (JP) ................ H04L/12/28

* cited by examiner

Primary Examiner—Min Jung
(74) Attorney, Agent, or Firm—Hogan & Hartson, LLP (57) ABSTRACT

When there exist transmittable cells at the virtual ports communicating with the same physical port, the virtual port delay observing section (140) observes the delay times at the virtual ports, respectively for each physical port. The virtual port delay comparing section (150) compares the observed delay times. The maximum delay virtual port designating section (160) designates the virtual port having the longest delay time, as the maximum delay virtual port, from among the virtual ports corresponding to the physical port designated by the transmission physical port designating section (120). On the other hand, when there exists no transmittable cell at the virtual ports communicating with the same physical port, the first-out virtual port observing section (130) designates the virtual port at which the transmittable cell develops first, as the maximum delay virtual port without comparing the delay times. When the maximum delay virtual port designating section (160) designates one physical port, it is necessary to wait until the load data of all the physical ports have been decided. However, before that, since the virtual port having the longest delay time is designated for each physical port, it is possible to start the processing for discriminating the maximum delay virtual port beginning from an early time.

4 Claims, 8 Drawing Sheets

| PHYSICAL PORT | MAX DELAY VIRTUAL PORT |
|---|---|
| 301 | 331 |

| PHYSICAL PORT | MAX DELAY VIRTUAL PORT |
|---|---|
| 401 | 431 |
| 402 | 433 |
| ⋮ | ⋮ |
| 403 | 435 |

METHOD AND APPARATUS FOR CONTROLLING PHYSICAL PORT FLOW RATE IN PACKET COMMUNICATIONS

BACKGROUND OF THE INVENTION

1. Field of the Invention

The present invention relates to a method and an apparatus for controlling the flow rate of cells at one or plural physical ports in packet communications, in particular in asynchronous transfer mode (referred to as ATM, hereinafter) communication system.

2. Description of the Prior Art

In a packet communication system, in particular in an ATM communication system, communications are executed in transfer unit called "cell". In this case, shaping control for controlling cell flow rate is executed in order to suppress the fluctuations of the flow rate of communications. Here, the shaping control is one of usage parameter controls. In this control method, cell flow rate is always monitored at each virtual transmission port, and whenever the flow rate exceeds a predetermined value, the cell transmission is delayed for shaping so that the cell flow rate does not exceed the predetermined value.

Figure 9:
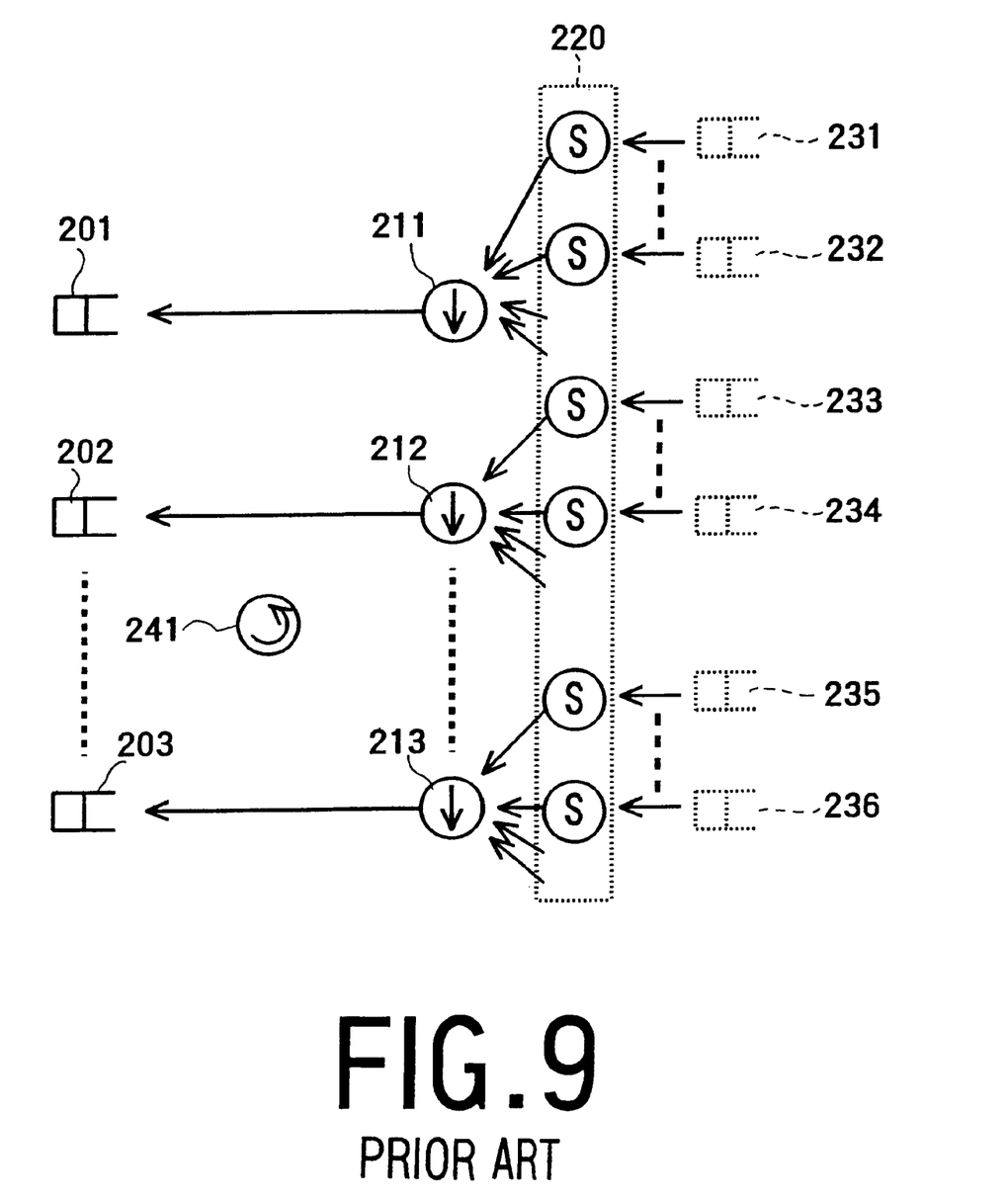
FIG. 9 is a block diagram showing the prior art physical port flow rate control apparatus.

A prior art shaping control method will be explained hereinbelow with reference to FIG. 9. In FIG. 9, there are a plurality of virtual ports 231 to 232, 233 to 234, . . . , 235 to 236 in correspondence to a plurality of physical ports 201, 202, . . . , 203, respectively. The virtual ports 231 to 232, 233 to 234, . . . , 235 to 236 communicate with the physical ports 201, 202, . . . , 203, respectively under control of a shaper 220 and a plurality of schedulers 211, 212, . . . , 213.

When a cell is inputted to a queue of a buffer provided for each of the virtual ports 231 to 232, the intervals at which the cells are transmitted to the shaper 220 are managed so as to be smoothed. In addition, the schedulers 211 to 213 each provided for each of the physical ports 201 to 203 schedule both the cell of the queue shaped by the shaper 220 and the cell of the queue not shaped by the shaper 220. In general, the scheduling is executed in such a way that the queue to be shaped has a priority.

Further, a single scheduler 241 is provided as a whole, to select one physical port which transmits the cell, for each cell period, from among all the physical ports 201 to 203. This is because the physical port which can transmit cell for each cell period is only one. When there exist a cell shaped by the shaper 220, the scheduler 241 schedules the cell transmission in such a way that the corresponding cell can be transmitted to the selected physical port.

Figure 10:
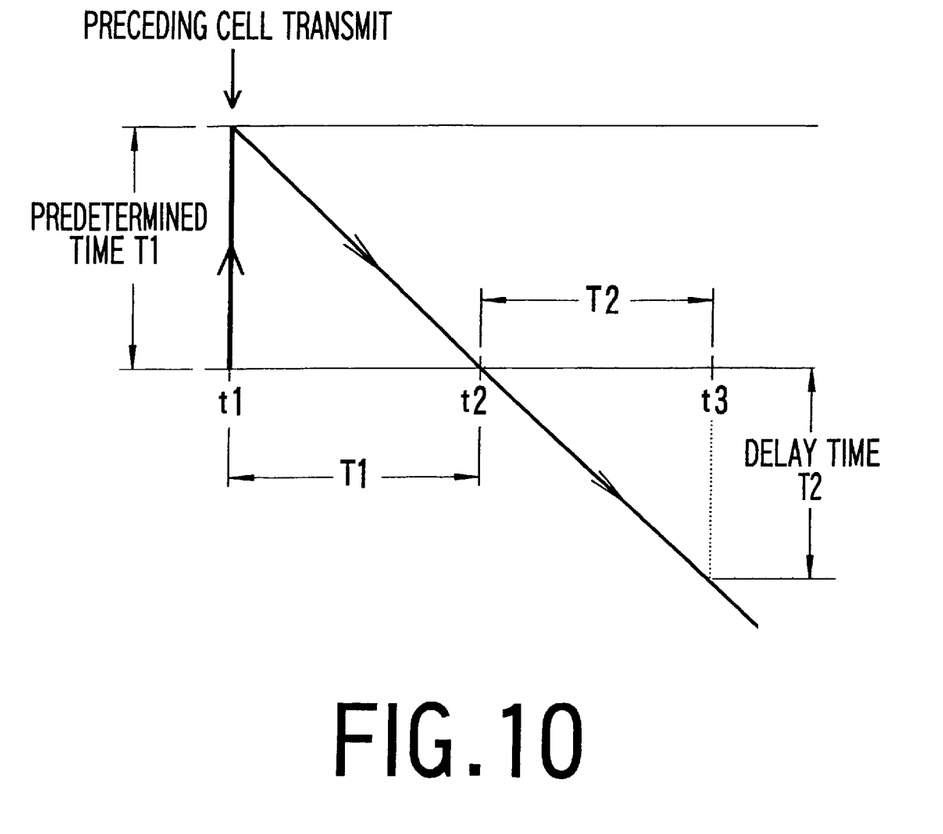
FIG. 10 is an illustration showing the predetermined time T1 between when the preceding cell is transmitted to when the succeeding cell is to be transmitted, and the delay time T2 after the predetermined time T1 has elapsed.

The above-mentioned prior art shaper 220 smooths the cell transmission intervals in accordance with the following procedure: The shaper 220 monitors the time elapsed after the preceding cell is transmitted for each of the virtual ports 231 to 236. For instance, as shown in FIG. 10, when the preceding cell is transmitted at a time point t1, at a time point t2 at which the predetermined time T1 has elapsed for shaping after the time point t1, the present cell can be transmitted. Therefore, a time elapsed after this time point t2 is a transmission delay time T2.

Further, when the cell transmission from the physical ports 201 to 203 to the rear stage apparatus stagnates, as when the cell transmission exceeds a predetermined transfer flow rate at the physical ports 201 to 203, there exists such a case that the cell transmission is still kept restricted even after the predetermined time T1 has elapsed. In this case, the shaper 220 monitors the transmission delay time T2 at each of the virtual ports 231 to 236, and when the load at the physical port is reduced below an allowable limit, the cell transmission is executed again, beginning from the maximum delay virtual port at which the transmission delay time T2 is maximum.

In the above-mentioned prior art flow rate control method, however, there exist the following problems: Since the maximum delay virtual ports must be discriminated, it is necessary to monitor and further compare all the cell transmission delay times T2 for each of all the virtual ports 231 to 236. Therefore, when the number of the virtual ports increases, the comparison processing of the transmission delay times is complicated more and more.

In addition, the processing of comparing the transmission delay times T2 must be executed within one cell period, after the load data (indicative of whether the load exceeds an allowable limit or not) have been decided at all the physical ports 201 to 203. In other words, the processing of discriminating the maximum delay virtual port must be perfectly completed, after the preceding cell has been transmitted at the time point t1, but between a time point when all the load data at all the physical ports 201 to 203 have been decided and a time point when the present cell must be transmitted. In general, however, it takes a relatively long time to decide the load data at all the physical ports. Therefore, the time interval between when all the load data are decided and when the present cell is transmitted is relatively short, so that it has been difficult to complete the discrimination processing of the maximum delay virtual port.

Further, in the case where there exist no transmittable cells stored in queues in the virtual ports 231 to 236 communicating with a physical port, there exists such a case that queues storing transmittable cells develop concentratively in a time shorter than a single cell period. Further, there exists such the case where the delay virtual ports develop concentratively within the same cell period at a plurality of the physical ports. In these cases, it is substantially impossible to discriminate the virtual port through which the cell is to be transmitted within a short time.

To overcome these problems, in the prior art flow rate control method, a plurality of buffer stages are provided at the front stage of the physical ports, to delay the timing at which the cell is transmitted to such an extent as to correspond to the number of the buffer stages. In this method, it is possible to obtain a time interval margin from when the load data are decided at all the physical ports to when the virtual port used to transmit the cell is discriminated. In this method, however, since the buffers are provided at the front stage of the physical ports, the cell transmission time itself is delayed, with the result that there exists a problem in that the throughput is lowered.

Further, in the case when a plurality of the physical ports are used and further demuitiplex communications are executed, the shaping must be executed at a plurality of physical ports, so that it is necessary to discriminate the maximum delay virtual port from among all the virtual ports. In this case, however, in the case where there exist a plurality of physical ports, the load data exist for each physical port and in addition the load data vary with the lapse of time. In the shaping at the physical ports, it is necessary to delay the transmission of the cell to the physical port having a large load and to transmit the cell to the physical port having no load. Therefore, it is necessary to select the maximum delay virtual port from among the virtual ports communicating with the physical port having no load. In this case, however, since the sequence of the queues at the virtual ports is not decided until the load data are decided, it is impossible to previously discriminate the maximum delay virtual port.

SUMMARY OF THE INVENTION

With these problems in mind, therefore, it is the object of the present invention to provide a method and apparatus for controlling the cell flow rate at the physical port or the physical ports, whose throughput can be improved by setting early the time point of the processing of discriminating the maximum delay virtual port, without complicating the discriminating processing of the maximum delay virtual port even if the virtual ports are increased and without providing any buffers at the front stage of the physical port or the physical ports.

To achieve the above-mentioned object, the present invention provides a method of controlling physical port flow rate in packet communications provided with a physical port for passing transfer units and a plurality of virtual ports for transmitting given transfer units to the physical port, which comprises: a step of observing transmission delay times at the virtual ports, respectively when there exist transmittable transfer units at the virtual ports, to designate the virtual port having the longest transmission delay time as the maximum delay virtual port; a step of designating the virtual port at which the transmittable transfer unit develops first, as the maximum delay virtual port, when there exists no transmittable transfer unit at any virtual ports; and a step of communicating the designated maximum delay virtual port with the physical port, to transmit the transfer unit.

Further, the present invention provides a method of controlling physical port flow rate in packet communications provided with a plurality of physical ports each for passing transfer units, and a plurality of virtual ports existing in correspondence to each of the physical ports and each for transmitting given transfer units to the corresponding physical port, which comprises: a step of observing transmission delay times at the virtual ports, respectively when there exist transmittable transfer units at the virtual ports communicating with the same physical port, to designate the virtual port having the longest transmission delay time for each physical port; a step of designating the virtual port which communicates with the same physical port and at which the transmittable transfer unit develops first, as the maximum delay virtual port, when there exists no transmittable transfer unit at any virtual ports communicating with the same physical port; and a step of designating any one of the physical ports on the basis of load data of the physical ports, to communicate the maximum delay virtual port corresponding to the designated physical port with the same physical port, to transmit the transfer unit.

Here, when there exist transmittable transfer units at the virtual ports, the step of observing the transmission delay time at the virtual ports is started beginning from a time point when the transfer unit can be transmitted, so that it is possible to discriminate the maximum delay virtual port in a one-cell period at its maximum.

Further, the present invention provides an apparatus for controlling physical port flow rate in packet communications provided with a physical port for passing transfer units and a plurality of virtual ports for transmitting given transfer units to the physical port, which comprises: virtual port delay observing means for observing transmission delay times at the virtual ports, respectively when there exist transmittable transfer units at the virtual ports; virtual port delay comparing means for comparing the observed transmission delay times; first-out virtual port observing means for observing the virtual port at which the transmittable transfer units develops first, when there exists no transmittable transfer unit at any virtual ports; and maximum delay virtual port designating means for designating the virtual port whose transmission delay time is decided as being the maximum by said virtual port delay comparing means, as the maximum delay virtual port, when there exist the transmittable transfer units at the virtual ports; and designating the virtual port at which the transmittable transfer unit develops first and which is observed by said first-out virtual port observing means, as the maximum delay virtual port, when there exists no transmittable transfer unit at any virtual ports.

Further, the present invention provides an apparatus for controlling physical port flow rate in packet communications provided with a plurality of physical ports each for passing transfer units, and a plurality of virtual ports existing in correspondence to each of the physical ports and each for transmitting given transfer units to the corresponding physical port, which comprises: virtual port delay observing means for observing transmission delay times at the virtual ports, respectively when there exist transmittable transfer units at the virtual ports communicating with the same physical port; virtual port delay comparing means for comparing the observed transmission delay times; transmission physical port designating means for designating any one of the physical ports on the basis of load data of the physical ports; first-out virtual port observing means for observing the virtual port at which the transmittable transfer unit develops first, when there exists no transmittable transfer unit at any virtual ports communicating with the same physical port; and maximum delay virtual port designating means for designating the virtual port whose transmission delay time is decided as being the maximum by said virtual port delay comparing means, from among the virtual ports corresponding to the physical port designated by said transmission physical port designating means, as the maximum delay virtual port, when there exist the transmittable transfer units at the virtual ports communicating with the same physical port; and for designating the virtual port at which the transmittable transfer unit develops first and which is observed by said first-out virtual port observing means, as the maximum delay virtual port communicating with the physical port, when there exists no transmittable transfer unit at any virtual ports communicating with the same physical port.

Here, said virtual port delay observing means starts to observe the transmission delay times at the virtual ports, respectively beginning from a time point when the transfer unit can be transmitted, so that it is possible to discriminate the maximum delay virtual port in a one-cell period at its maximum.

In the method and apparatus for controlling cell (transfer unit) flow rate at a physical port or physical ports according to the present invention, in the case where there exists a single physical port and further transmittable cells exist, the maximum delay virtual port is discriminated by comparing the delay times of the virtual ports. Further, when the transmittable cells do not exist, the virtual port at which the transmittable cell first develops at the queue is decided as the maximum delay virtual port. Further, when there exist a plurality of the physical ports, the discriminating processing is started after the preceding cell has been transmitted (without waiting the decision of the load data at the physical ports). Therefore, it is possible to secure the time interval at which the discriminating processing is executed by one cell transmission period at its maximum, with the result that the throughput can be improved without use of any redundant buffers.

DETAILED DESCRIPTION OF THE PREFERRED EMBODIMENTS

An embodiment of the method and apparatus for controlling physical port flow rate according to the present invention will be described hereinbelow with reference to the attached drawings.

Figure 1:
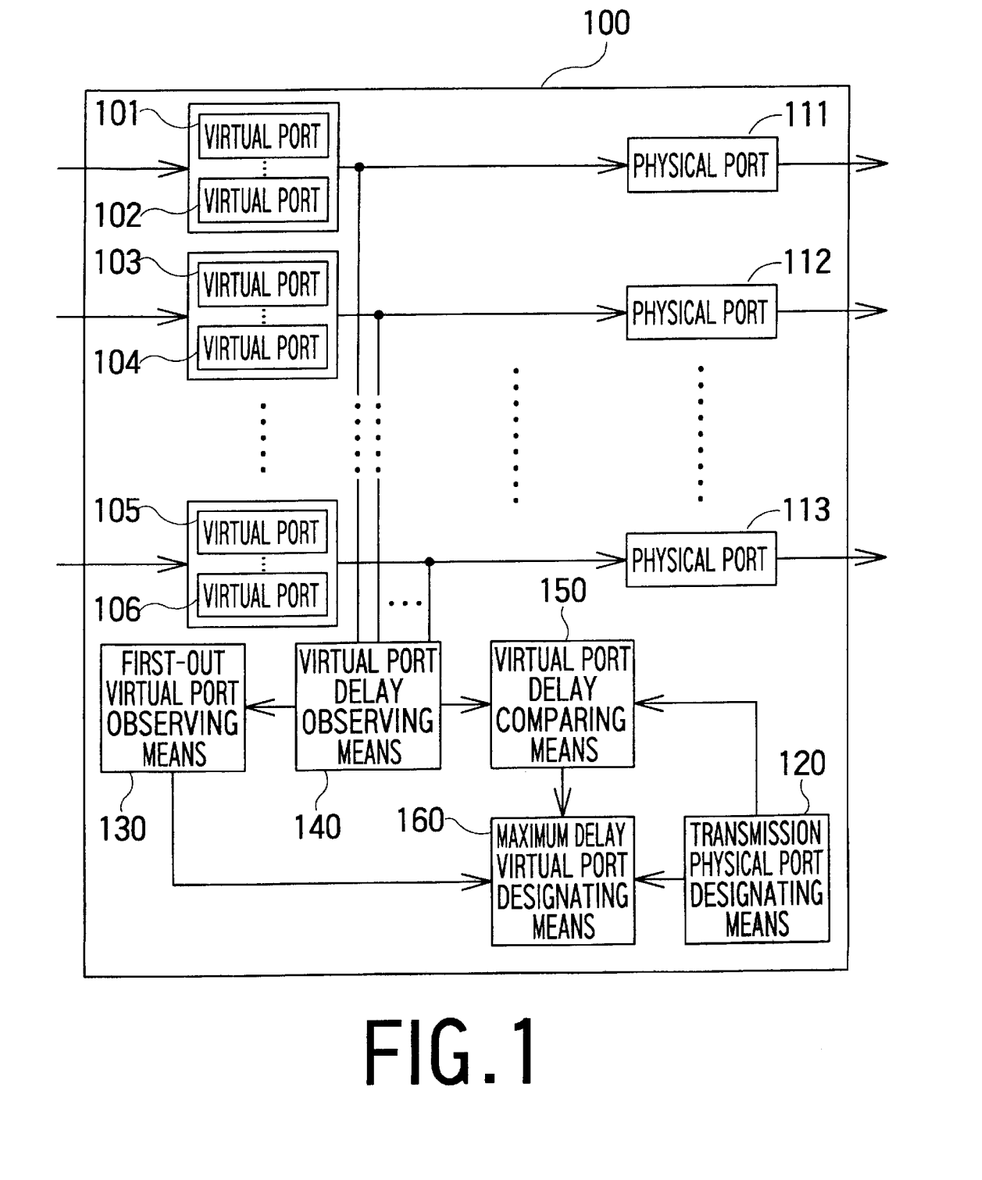
FIG. 1 is a block diagram showing an embodiment of the physical port flow rate control apparatus according to the present invention.

FIG. 1 is a block diagram showing an embodiment of the apparatus for controlling the physical port flow rate according to the present invention.

A cell (transfer units) outputted from an ATM (asynchronous transfer mode) switchboard or exchange (not shown) is inputted into a buffer, and further stored in a queue provided in the buffer. The cell stored in the queue of the buffer is shaped by a flow rate control apparatus 100, and then transferred to a physical layer provided in a receiver apparatus (not shown).

A plurality of physical ports 111, 112, ..., 113 are provided, and a plurality of virtual ports 101 to 102, 103 to 104, ..., 105 to 106 are provided, respectively in correspondence to the physical ports 111 to 113. A transmission physical port designating means 120 corresponds to a scheduler (described after). Virtual port delay observing means 140, first-out virtual port observing means 130, virtual port delay comparing means 150, and maximum delay virtual port designating means 160 correspond to a shaper.

The virtual port delay observing means 140 observes the transmission delay time T2 elapsed after the time point t2 at each of all the virtual ports 101 to 106. Here, t2 is a time point obtained when a predetermined time T1 has elapsed after the transmission of the preceding cell. The lengths of the predetermined time T1 in the respective virtual ports can be set independently.

The virtual port delay comparing means 150 compares mutually the observed transmission delay times T2 at the virtual ports 101 to 102, 103 to 104, ..., 105 to 106 communicating with the respective physical ports, which are observed by the virtual port delay observing means 140.

The transmission physical port designating means 120 designates any one of the physical ports which can transmit the succeeding cell because the transfer flow rate is below an allowable value, on the basis of the load data at the physical ports 111 to 113.

When there exist no transmittable cell at each of all the virtual physical ports 101 to 102, 103 to 104, ..., 105 to 106 communicating with the same physical port; that is, when all the cells stored in the queues for the same physical port have not elapsed the predetermined time T1; or when no cells have reached the queues of the virtual ports 101 to 102, 103 to 104, ..., 105 to 106 communicating with the physical ports, respectively after the predetermined time T1 has elapsed, the first-out virtual port observing means 130 observes the virtual port at which there exist the cell first reaching the predetermined time T1, or the virtual port at which the cell first arrives after the predetermined time T1 had elapsed, that is, the virtual port communicating with the physical port at which the transmittable cell first develops. Here, the maximum delay virtual port is discriminated before the physical port is designated.

When the transmittable cell exists at any of the virtual ports 101 to 102, 103 to 104, ..., 105 to 106 communicating with the physical ports, the maximum delay virtual port designating means 160 designates the maximum delay virtual port of the longest delay time for each of the physical ports 111 to 113, on the basis of the comparison results of the virtual port delay comparing means 150. When there exists no transmittable cell communicating with each physical port, the maximum delay virtual port designating means 160 designates the virtual port communicating with the physical port at which the transmittable cell first develops (which is observed and detected by the first-out virtual port observing means 130), as the maximum delay virtual port communicating with the physical port. Further, the maximum delay virtual port designating means 160 designates the virtual port of the maximum transmission delay time T2 (whose load data of the physical ports 111 to 113 have been decided) as the maximum delay virtual port, among the virtual ports corresponding to one physical port designated by the transmission physical port designating means 120.

Here, the operation of the embodiment of the physical port flow rate control apparatus according to the present invention provided with the above-mentioned construction will be described hereinbelow by classifying the case where there exists a single physical port and the case where there exist a plurality of physical ports.

Figure 2:
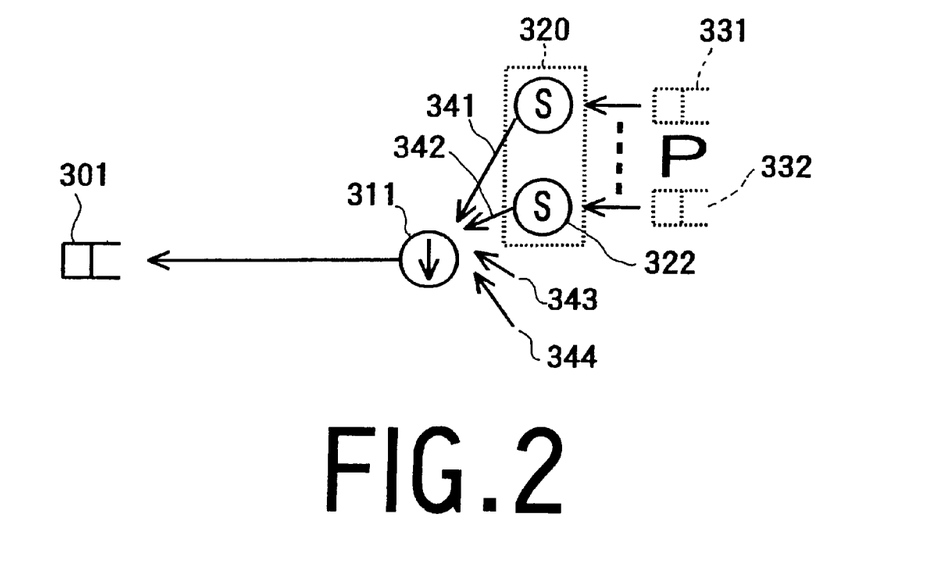
FIG. 2 is a schematic block diagram showing an embodiment of the flow rate control apparatus for executing processing of discriminating the maximum delay virtual port when a single physical port exists.
Figure 4:
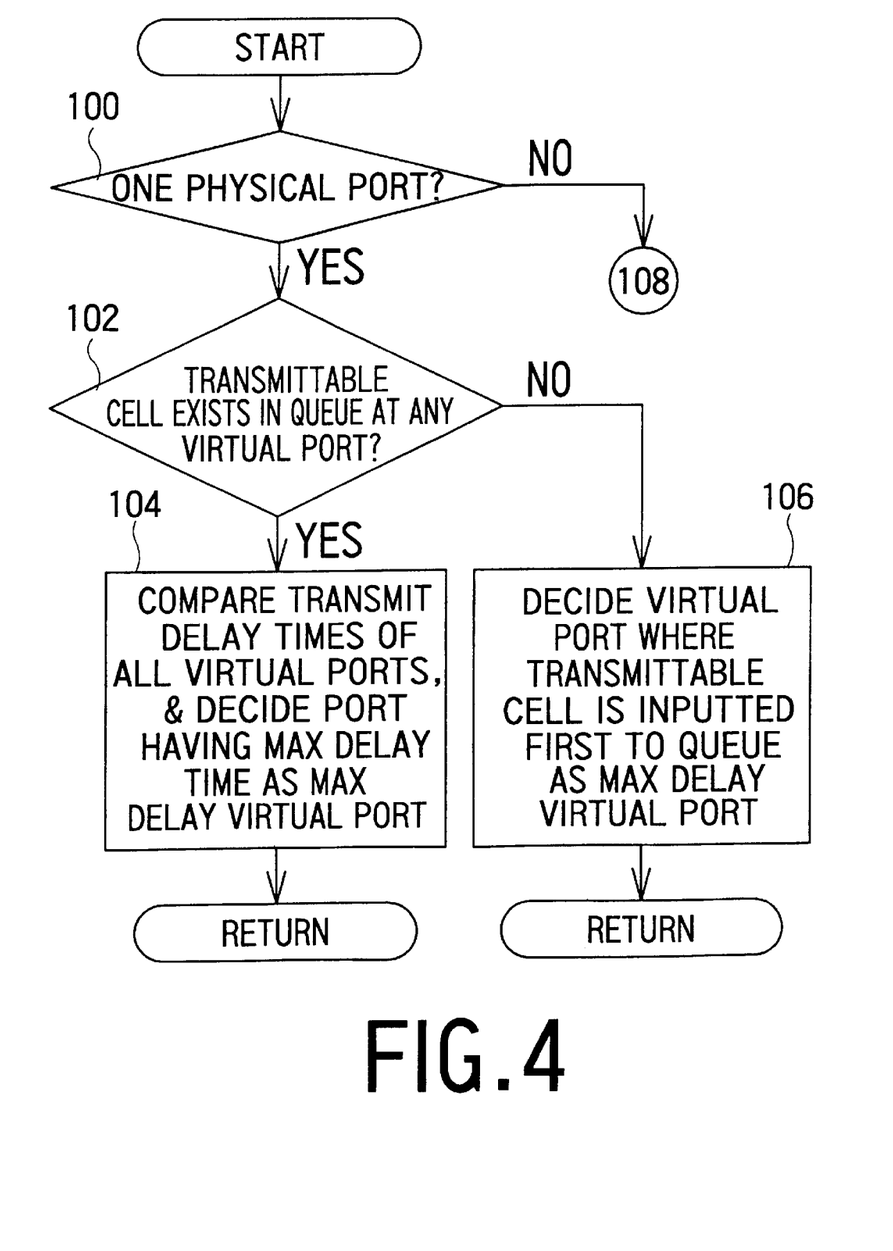
FIG. 4 is a flowchart showing a procedure of the embodiment of the flow rate control apparatus for executing the processing of discriminating the maximum delay virtual port when a single physical port exists.

(1) When a single physical port exists:

FIG. 2 is a block diagram and FIG. 4 is a flowchart of the flow rate control apparatus, both for assistance in explaining the operation thereof. Here, the assumption is made that there exist p-units of the virtual ports 331 to 332 in correspondence to a single physical port 301. Further, paths through which the cells controlled by the shaper 320 are transmitted are denoted by 341 and 342, and paths through which the cells not controlled by the shaper 320 are transmitted are denoted by 343 and 344. Any one of these paths 341 and 342 and 343 and 344 is selected by the scheduler 311, so that any one of the virtual ports is eventually communicating with the physical port 301.

In the construction of the flow rate control apparatus shown in FIG. 1, only the paths through which the cells controlled by the shaper (including the first-out virtual port observing means 130, the virtual port delay observing means 140, the virtual port delay comparing means 150, and the maximum delay virtual port designating means 160) are transmitted can be controlled. Therefore, since there exist no paths 343 and 344 as shown in FIG. 2 through which the cells not controlled by the shaper 320 are transmitted, the element corresponding to the scheduler 311 is unnecessary.

In contrast with this, in the construction as shown in FIG. 2, there exist the paths 343 and 344 not controlled by the shaper 320. Therefore, the scheduler 311 is provided to schedule the controlled paths 341 to 342 with priority, between paths 341 and 342 controlled by the shaper and the paths 343 and 344 not controlled by the shaper.

Figure 3:
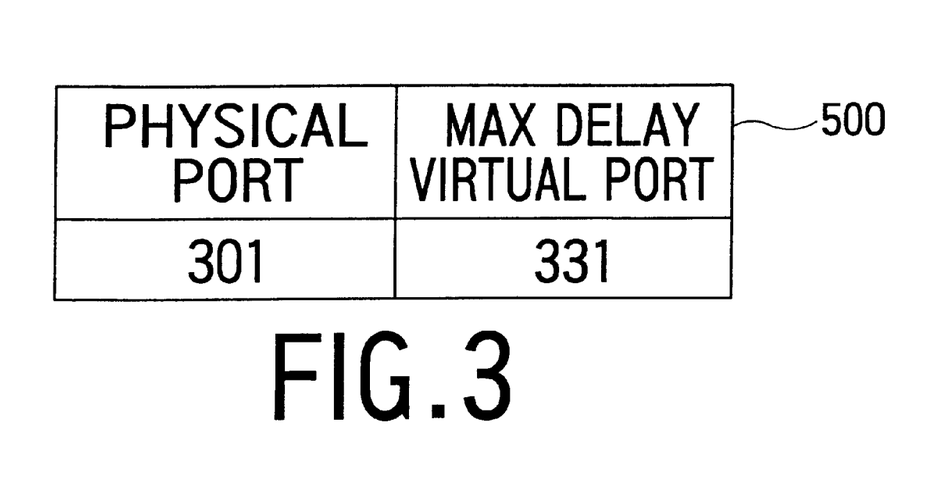
FIG. 3 is an illustration showing a table used for the apparatus shown in FIG. 2.

For discrimination of the maximum delay virtual port, the flow rate control apparatus uses a table as shown in FIG. 3. The table 500 has a space in which one physical port 301 is written and the other space in which the maximum delay virtual port discriminated is written.

Here, the queue is formed in the buffer (not shown) existing at the front stage of each of the virtual ports 331 and 332. Therefore, in step 102, when there exists the transmittable cell elapsed by the predetermined time T1 after the preceding cell has been transmitted in the queue of any virtual port, in step 104, the shaper 320 discriminates the maximum delay virtual port. In this discriminating processing, as already explained with reference to FIG. 1, the virtual port having the maximum delay time is selected. Further, this discriminating processing is executed from the time point t1 when the preceding cell is transmitted in the preceding cell period to the time when the present cell is transmitted during one cell period, at its maximum. However, when the discriminating processing can be executed in a relatively short time, the processing is not necessarily started beginning from the time point t1.

The discriminated maximum delay virtual port is written in the space of the table shown in FIG. 3. Here, although the scheduler 311 schedules not only the cells controlled by the shaper but also the cells transmitted through the paths 343 and 344 not controlled by the shaper 320, the virtual port written in the space of the maximum delay virtual port is so scheduled as to communicate with the physical port 301 with priority.

When there exist no transmittable cell elapsed by the predetermined time T1 after the preceding cell has been transmitted in the queue of each of all the virtual ports 331 to 332, the space of the maximum delay virtual port of the table shown in FIG. 3 is blanked. In this case, in step 106, the virtual port at which the transmittable cell is first inputted to the queue thereof is determined as the maximum delay virtual port, and then this virtual port is written in the space of the table shown in FIG. 3. Therefore, even in the case where the cell to be transmitted in the present cell period does not develop and thereby the space of the maximum delay virtual port is blanked and after that where the transmittable cells are inputted to the virtual ports in succession at the same time, it is possible to easily discriminate the maximum delay virtual port, with the result that the maximum delay virtual port can be discriminated in a short time before the time at which the cells must be transmitted. In this case, in the same way as with the case where there exists the transmittable cell, the scheduler 311 selects the virtual port written in the space of the maximum delay virtual port of the table with priority, under shaping control.

Figure 5:
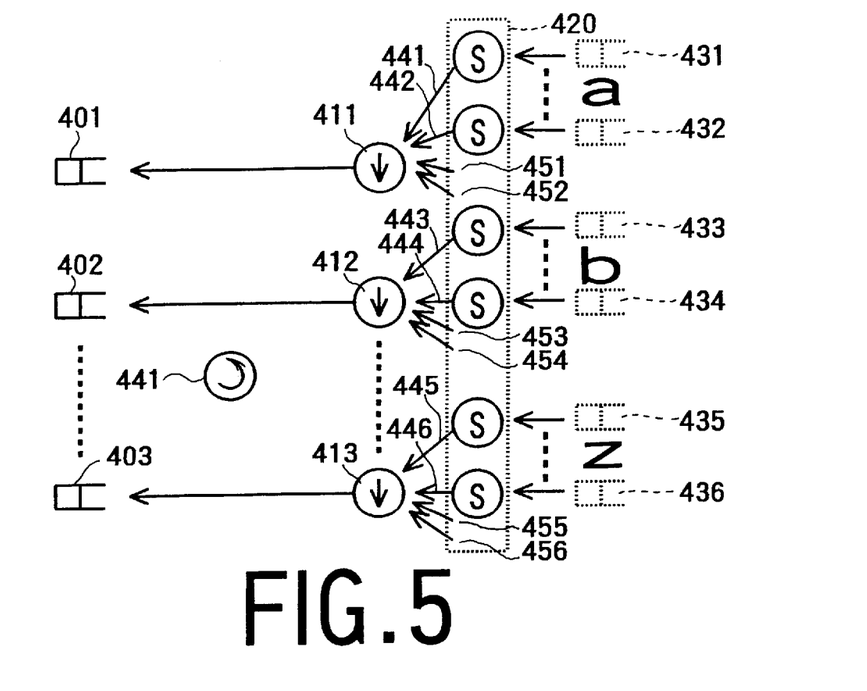
FIG. 5 is a schematic block diagram showing an embodiment flow rate control apparatus for executing the processing of discriminating the maximum delay virtual port when a plurality of physical ports exist.
Figure 6:
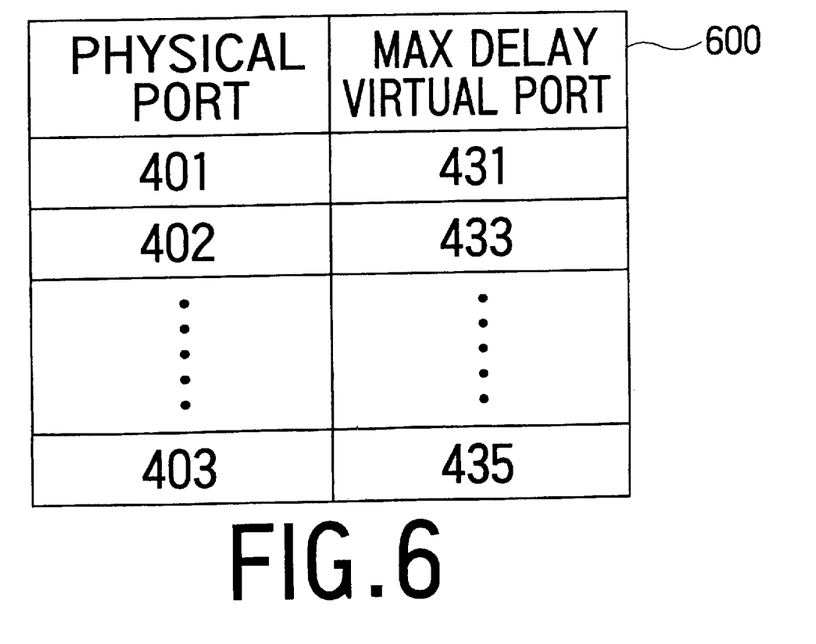
FIG. 6 is an illustration showing a table used for the apparatus shown in FIG. 5.

(2) When a plurality of physical ports exist:

FIG. 5 is a block diagram and FIG. 6 is a flowchart of the flow rate control apparatus, both for assistance in explaining the operation thereof. Here, there exist "a"-units of the virtual ports 431 to 432 in correspondence to a physical port 401; there exist "b"-units of the virtual ports 433 to 434 in correspondence to a physical port 402; . . . ; and there exist "z"-units of the virtual ports 435 to 436 in correspondence to a physical port 403.

The scheduler 441 corresponds to the transmit physical port designating means 120 shown in FIG. 1, which can select one of the transmittable physical port on the basis of the load data of the physical ports 401 to 403.

In the case of the physical port 401, for example, there exist paths 441 to 442 through which the cells inputted to the queues of the virtual ports 431 to 432 and controlled by the shaper 420 are transmitted and paths 451 to 452 through which the cells transferred from the queues of the buffers (not shown) without control of the shaper 420 but scheduled by the scheduler 311 are transmitted.

When there exist a plurality of the physical ports 401 to 403, a table 600 as shown in FIG. 6 is used. This table 600 has spaces in which the physical ports 401 to 403 are written and other spaces in which the maximum delay virtual ports are written for each of the physical ports 401 to 403.

Figure 7:
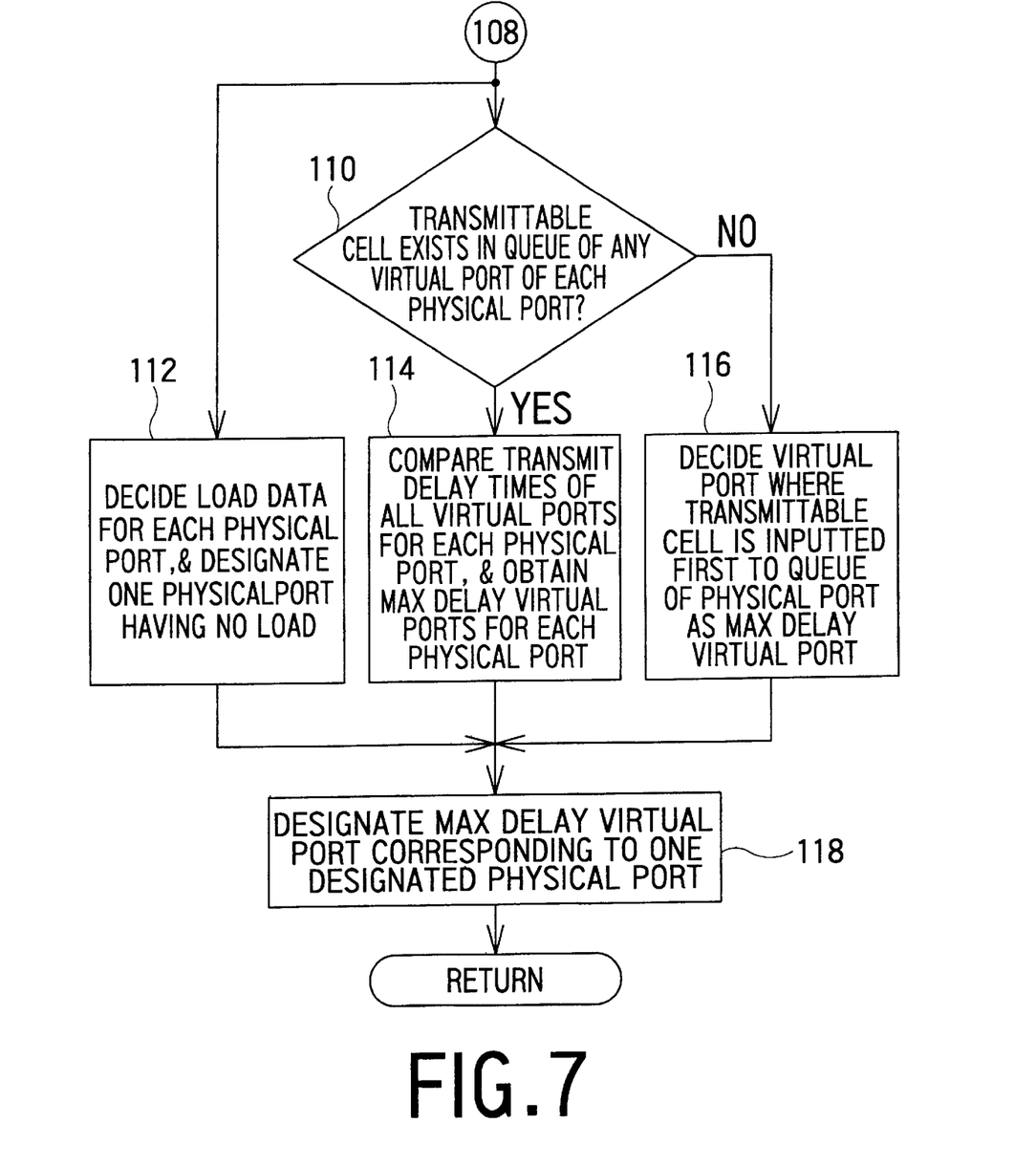
FIG. 7 is a flowchart showing a procedure of the embodiment of the flow rate control apparatus for executing the processing of discriminating the maximum delay virtual port when a plurality of physical ports exist.

In step 110, it is discriminated whether there exist the transmittable cell in the queue at any virtual port of each of the physical ports or not. If the transmittable cell exists, the processing of step 114 is started. In step 112, the scheduler 441 designates any one of the physical port having no load, after the load data of the physical ports 401 to 403 have been all decided. In step 114, the shaper 420 designates the maximum delay virtual port for each of the physical ports 401 to 403. The discriminated maximum delay virtual port is written in the space for the maximum delay virtual port arranged in correspondence to the physical port 401, in the table shown in FIG. 6. In step 112, when one physical port whose load data is decided is designated, in step 118, the maximum delay virtual port corresponding to the physical port is designated.

In step 110, when there exist no transmittable cells in the queues of all the virtual ports communicating with the same physical port, after the predetermined time has elapsed after the transmission of the preceding cell, the space of the maximum delay virtual port of the corresponding physical port is blanked in the table shown in FIG. 6. In this case, in step 116, the virtual port communicating with the physical port at which the transmittable cell first develops in the queue is written in the table as the maximum delay virtual port. Therefore, even in the case where the transmittable cell does not develop in the succeeding cell period; or where the space of the maximum delay virtual port of the physical port is blanked and after that where the transmittable cells are inputted to the virtual ports at roughly the same period, it is possible to discriminate the maximum delay virtual port easily and quickly for each physical port.

The scheduler 441 selects the cell at the virtual port written in the space of the maximum delay virtual port under control of the shaper with priority and transmits the selected cell to the designated physical port 401, in comparison with the cells transmitted through the paths 441 to 442 not controlled by the shaper.

Figure 8:
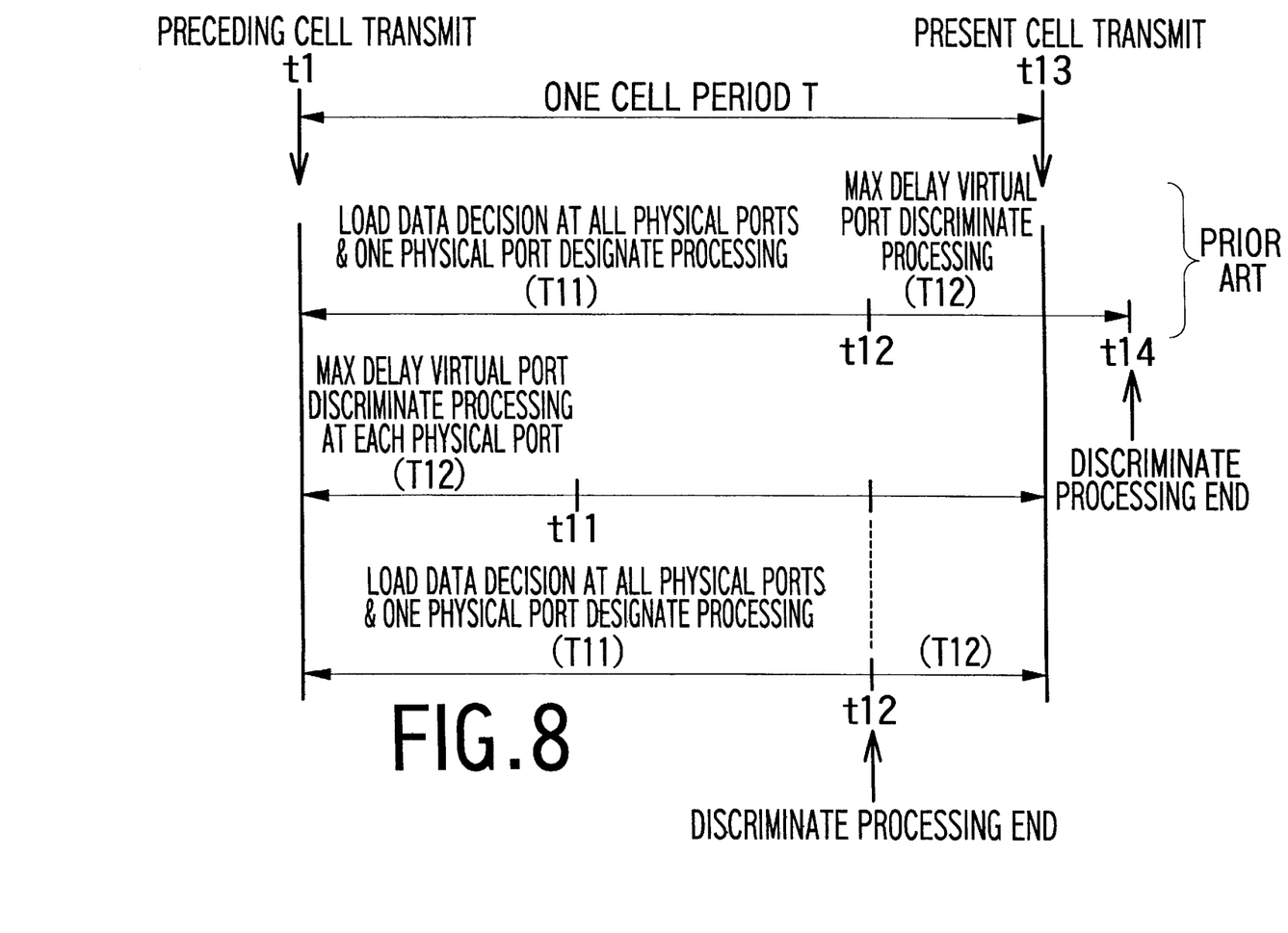
FIG. 8 is an illustration for assistance in explaining a comparison between the discriminating processing of the control method according to the present invention and that of the prior art control method.

FIG. 8 shows the cell transmission in comparison between the transfer flow rate control apparatus according to the present invention and the prior art apparatus. As shown, in the case of the prior art apparatus, the discriminating processing cannot be started from the time point t1 when the preceding cell has been transmitted to the time point t12 when a time T11 has elapsed until the load data of all the physical ports are decided, so that the time between the time point t12 to the time point t13 (at which the present cell is transmitted) is short. Therefore, when the discriminating processing takes a long time period T12 from t12 to t14 (which is longer than the time from t12 to t13), since the discriminating processing cannot be completed within the one-cell period, it has been necessary to provide redundant buffers, for instance at the front stage of the physical ports.

In contrast with this, in the case of the flow rate control apparatus according to the present invention, the processing of designating the maximum delay virtual port for each physical port is started beginning from the time point t1, in parallel to the processing of designating any one of the physical port (which is executed after the load data of all the physical ports have been decided). Therefore, it is possible to designate the maximum delay virtual port from among the virtual ports corresponding to the physical port immediately at the time point t12 at which the physical port has been designated. Therefore, the throughput can be improved without providing any redundant buffers, for instance. The feature of the present invention is particularly effective when the time required to compare the transmission delay times for each of the increasing virtual ports.

The above-mentioned embodiment is described by way of example, so that the present invention is not limited only to the above-mentioned embodiment. For instance, in the apparatus construction shown in FIG. 1, since there exist a plurality of physical ports, the transmission physical port designating means 120 is provided to select any one of the physical ports on the basis of the load data. In the case where only the single physical port exists, however, this transmission physical port designating means 120 is not necessary. Further, when there exist the cells inputted under the shaping control as shown in FIGS. 2 and 3, the scheduler 311 or schedulers 411 to 413 are necessary. However, when there exist no such cells, it is unnecessary to provide the scheduler 311 or schedulers 411 to 413, in the same way as with the case shown in FIG. 1.

Further, in the apparatus shown in FIGS. 2 and 5, the tables as shown in FIGS. 3 and 6 are used when the maximum delay virtual port is discriminated. However, the data listed in the table are not necessarily required. That is, any method can be adopted, as far as the physical ports and the maximum delay virtual ports can be designated in corresponding relationship between both.

What is claimed is:

1. A method of controlling physical port flow rate in packet communications provided with a plurality of physical ports each for passing transfer units, and a plurality of virtual ports existing in correspondence to each of the physical ports and each for transmitting given transfer units to the corresponding physical port, which comprises:

a step of deciding load data of the physical ports;

a step of designating one of the transmittable physical ports on the basis of the load data;

a step of designating the maximum delay virtual port which should be connected with the designated physical port, in parallel with the step of designating one of the transmittable physical ports; and a step of connecting the designated maximum delay virtual port with the designated physical port, and passing the transfer units, wherein the step of designating the maximum delay virtual port has:

a step of observing transmission delay time at the virtual ports, respectively when there exist transmittable transfer units at the virtual ports, to designate the virtual port having the longest transmission delay time as the maximum delay virtual port; and a step of designating the virtual port at which the transmittable transfer unit develops first, as the maximum delay virtual port, when there exists no transmittable transfer unit at any virtual ports.

2. The method of controlling physical port flow rate in packet communications of claim 1, wherein when there exist transmittable transfer units at the virtual ports, the process of observing the transmission delay time at the virtual ports is started beginning from a time point when the transfer unit can be transmitted.

3. An apparatus for controlling physical port flow rate in packet communications provided with a plurality of physical ports each for passing transfer units, and a plurality of virtual ports existing in correspondence to each of the physical ports and each for transmitting given transfer units to the corresponding physical port, the apparatus comprising:

load data deciding means for deciding load data of the physical ports;

physical port designating means for designating one of the transmittable physical ports on the basis of the load data;

virtual port designating means for designating the maximum delay virtual port which should be connected with the designated physical port, in parallel with designating one of the transmittable physical ports; and connecting and passing means for connecting the designated maximum delay virtual port with the designated physical port, and passing the transfer units, wherein the virtual port designating means has:

virtual port delay observing means for observing transmission delay times at the virtual ports, respectively when there exist transmittable transfer units at the virtual ports;

virtual port delay comparing means for comparing the observed transmission delay times;

first-out virtual port observing means for observing the virtual port at which the transmittable transfer unit develops first, when there exists not transmittable transfer unit at any virtual ports; and maximum delay virtual port designating means for designating the virtual port whose transmission delay time is decided as being the maximum by the virtual port delay comparing means, from among the virtual ports corresponding to the physical port designated by the transmission physical port designating means, as the maximum delay virtual port, when there exists the transmittable transfer units at the virtual ports, and for designating the virtual port at which the transmittable transfer unit develops first and which is observed by the first-out virtual port observing means as the maximum delay virtual port connecting with the physical port, when there exists no transmittable transfer unit at any virtual ports.

4. The apparatus for controlling physical port flow rate in packet communications of claim 3, wherein said virtual port delay observing means starts to observe the transmission delay times at the virtual ports, respectively beginning from a time point when the transfer unit can be transmitted.

* * * * *